United States Patent [19]

Richards

[11] Patent Number: 4,505,139
[45] Date of Patent: Mar. 19, 1985

[54] AUTOMOBILE ROOF PANEL LOCK

[75] Inventor: William D. Richards, Medway, Mass.

[73] Assignee: Comfort Auto Industries, Inc., Norwood, Mass.

[21] Appl. No.: 441,622

[22] Filed: Nov. 15, 1982

[51] Int. Cl.³ .................. E05B 13/10; E05B 55/06
[52] U.S. Cl. ..................... 70/221; 70/224; 70/472; 70/DIG. 31; 70/DIG. 39; 70/DIG. 67; 403/348
[58] Field of Search ................. 70/221–224, 70/218, 209, 207, DIG. 31, 472, 476, DIG. 39, DIG. 42, DIG. 67, 327, 328; 74/527; 403/348; 30/419

[56] References Cited

U.S. PATENT DOCUMENTS

| | | | |
|---|---|---|---|
| 195,400 | 9/1877 | Richard | 403/348 X |
| 958,815 | 5/1910 | Markham | 70/222 |
| 2,012,912 | 8/1935 | Hurd | 70/224 |
| 3,796,075 | 3/1974 | Grogan | 70/207 X |

FOREIGN PATENT DOCUMENTS

| | | | |
|---|---|---|---|
| 460164 | 5/1928 | Fed. Rep. of Germany | 70/221 |
| 538446 | 7/1954 | Italy | 70/221 |
| 637073 | 5/1950 | United Kingdom | 70/222 |

Primary Examiner—Robert L. Wolfe
Assistant Examiner—Lloyd A. Gall
Attorney, Agent, or Firm—Robert T. Gammons

[57] ABSTRACT

A lock for a vehicle sunroof panel including a handle for effecting rotation of the shaft and parts mounted to the shaft and handle cooperable by positioning of one relative to the other by means of a key-operated lock cylinder to on the one hand enable the handle and on the other hand to disable the handle.

13 Claims, 14 Drawing Figures

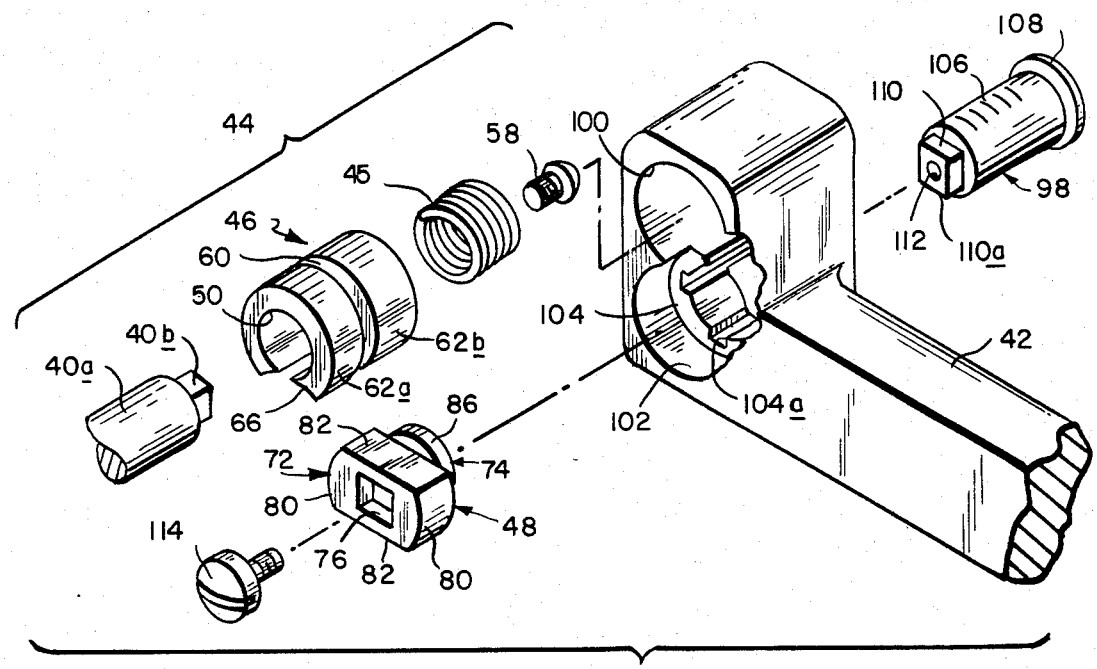
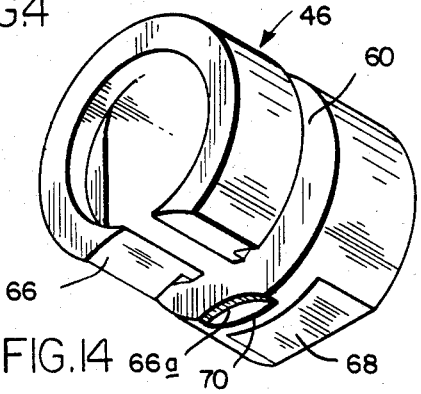
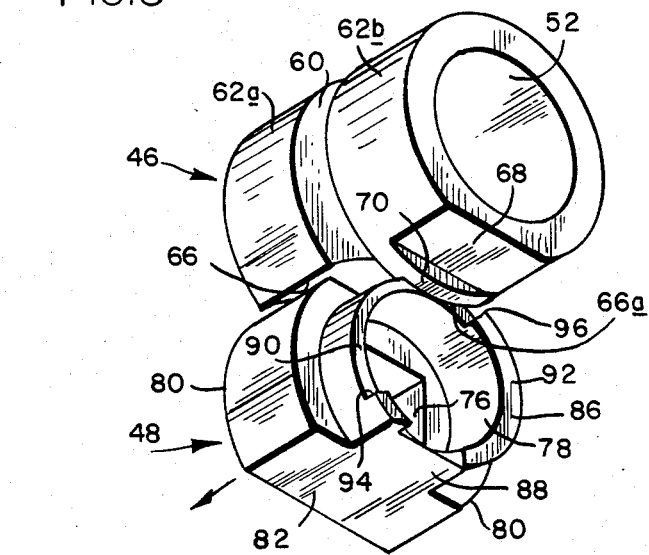
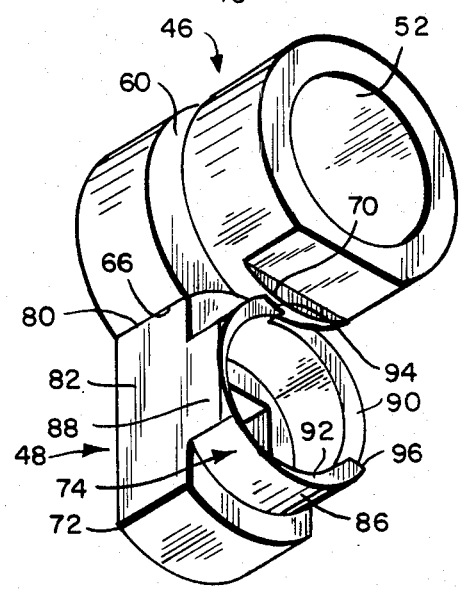
FIG.4
FIG.5
FIG.6
FIG.14
FIG.7
FIG.8

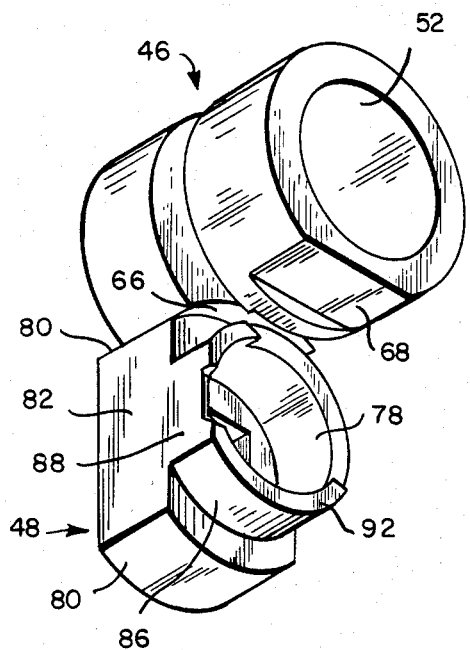
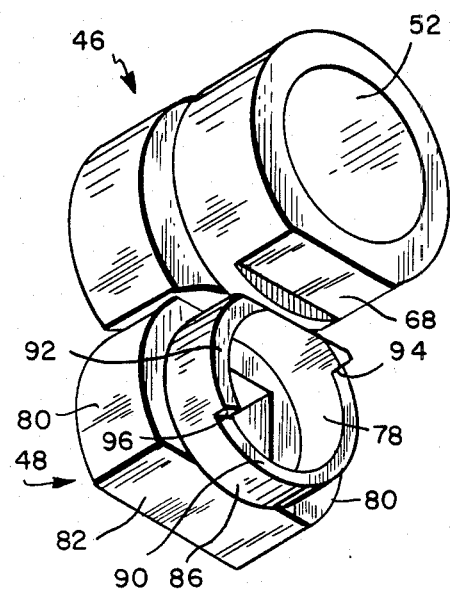
FIG. 9  FIG. 10
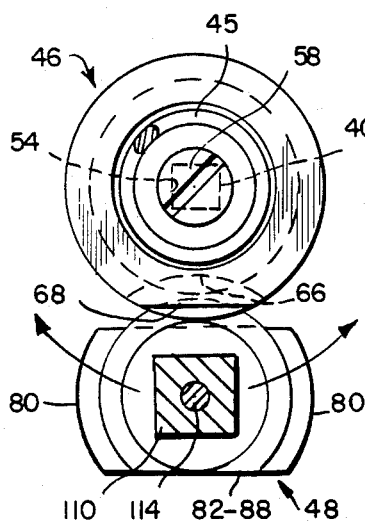
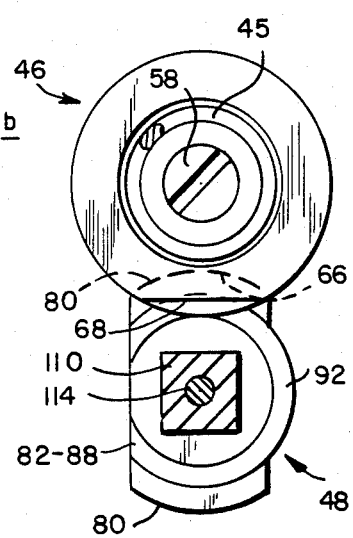
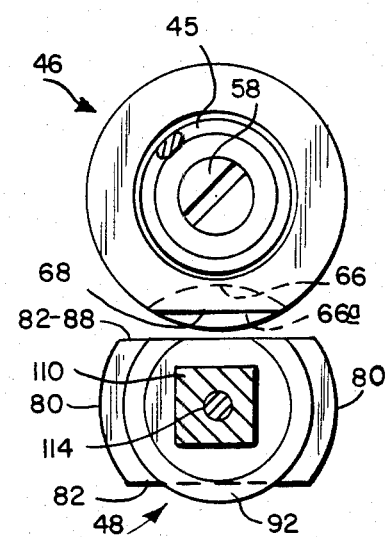
FIG. 11  FIG. 12  FIG. 13

AUTOMOBILE ROOF PANEL LOCK

BACKGROUND OF INVENTION

At the present time, so far as is known, translucent and/or transparent panels provided in the roof of a vehicle are hinged at one side to the roof structure and latched at the other side so that they can be opened or closed. The latch is accessible from the interior of the vehicle only and may include a lock to hold the panel closed and so, ordinarily, is secure from the outside but not from the inside. The panels may be installed by the manufacturer or custom-installed by the purchaser of the vehicle and because they are quite expensive, are frequently stolen by detaching them from the roof structure which is relatively easy if access is obtained to the interior of the vehicle. It is the purpose of this invention to make it more difficult to remove such panels by providing locking means which will not only prevent the panels from being opened from the exterior, but also from the interior without a key.

SUMMARY OF INVENTION

As herein illustrated, there is shown locking structure for securing the distal edge of a hinged roof panel wherein bolts are movable from a retracted position to an extended position by rotation of the shaft, and a handle is mounted to the shaft to effect its rotation comprising interengageable means mounted to the shaft and to the handle and a key operable to rotate the means mounted to the handle relative to the means mounted to the shaft to on the one hand lock said means relative to each other such that rotation of the handle turns said means in unison about the axis of the shaft so as to effect rotation of the shaft and on the other hand permits the means to rotate relative to each other such that rotation of the handle fails to rotate the shaft. The interengageable means comprise a first cylindrical part fixed to the shaft and a second cylindrical part rotatably mounted to the handle, said first cylindrical part containing an arcuate recess and said second cylindrical part having diametrically-opposed arcuate shoulders of a radius of curvature of the arcuate recess and diametrically-opposed flat sides at right angles thereto and wherein the cylinders are positioned in spaced, parallel openings in the handle for rotation about spaced, parallel axes so that by rotation of the cylindrical parts relative to each other, an arcuate shoulder of the second cylindrical part can be positioned on the one hand in the arcuate recess in the first cylindrical part, in which position rotation of the handle will rotate the shaft, and on the other hand in a position in which one of the flat sides is opposite the recess, in which position the handle is free to rotate about the shaft so that rotation of the handle will not rotate the shaft. In order to prevent flopping of the handle in this latter position, there is a concave detent in the first cylindrical part concentric with the arcuate recess therein for receiving the shoulder of the second cylindrical part. The first cylindrical part is non-rotatably fixed to the shaft so that rotation thereof will rotate the shaft. The second cylindrical part is rotatably mounted in its opening in the handle and is non-rotatably fixed to a key-operated tumber cylinder by means of which it can be rotated about its axis relative to the first cylindrical part when the latter occupies the other opening in the handle. There are interengageable means on the cylindrical parts which normally prevent the handle from being removed from the shaft which can be disengaged by movement thereon in a direction to compress a spring and rotation by means of the key-operated cylinder to disengage the interengageable parts to thus permit the handle to be removed from the shaft.

BRIEF DESCRIPTION OF THE DRAWINGS

The invention will now be described in greater detail with reference to the accompanying drawings, wherein:

FIG. 4 is a perspective exploded view of the locking components by means of which the handle can be alternately connected to and disconnected from the shaft by means of which the locking mechanism is actuated;

FIG. 5 is a perspective of the unlocked position of the locking mechanism as seen from the left side of FIG. 4 omitting the handle;

FIG. 6 is a perspective of the locked position of the locking mechanism as seen from the left side of FIG. 4 omitting the handle;

FIGS. 7, 8, 9 and 10 are perspective views to a larger scale from the right side of FIG. 4 showing the various positions of the locking components omitting the handle;

FIGS. 11, 12 and 13 are elevations as seen from the right side of FIG. 4 showing, respectively, an unlocked position, a locked position and the position of the parts which enables mounting and dismounting the handle to the shaft; and FIG. 14 is a perspective view of the upper one of the cylindrical parts shown in the foregoing Figures as seen from the left end and from the bottom side.

Sunroofs for automobiles have become quite popular and, when not provided by the manufacturer, are often custom-made and installed by removing a portion of the conventional roof and replacing it with a sunroof. In one form, two panels are provided hinged midway between the opposite sides of the roof for pivotal movement upwardly about the hinge line and provision is made at the distal edges of the panels to lock them in a closed position when it is not desirable to have them open. Because of the fact that the panels are quite expensive, it is not unusual to have them stolen since all that is necessary is to gain access to the interior of the vehicle and then to release the locks which hold the panels closed and remove the panels together with the locks. The purpose of the present invention is to disable the locks so that even though access is gained to the interior of the car, the panels cannot be unlocked and so cannot be removed.

Figure 1:
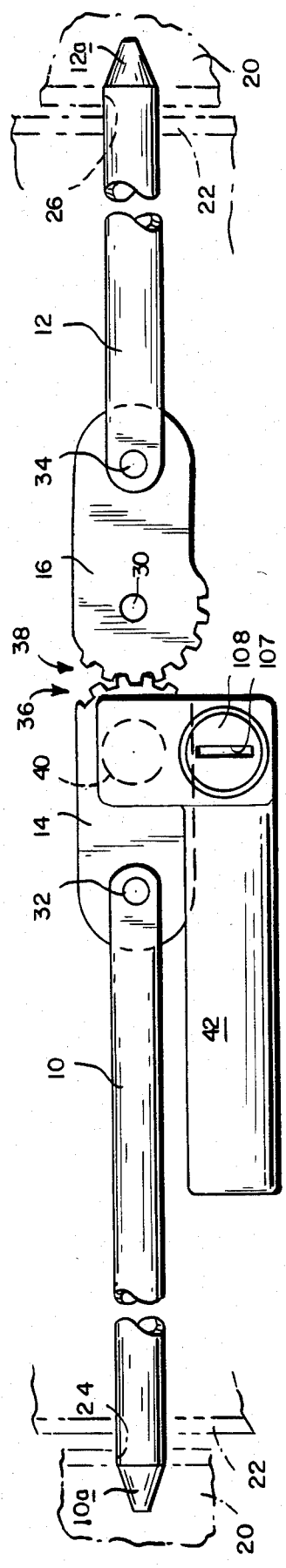
FIG. 1 is an elevation of the locking mechanism in the locking position.
Figure 2:
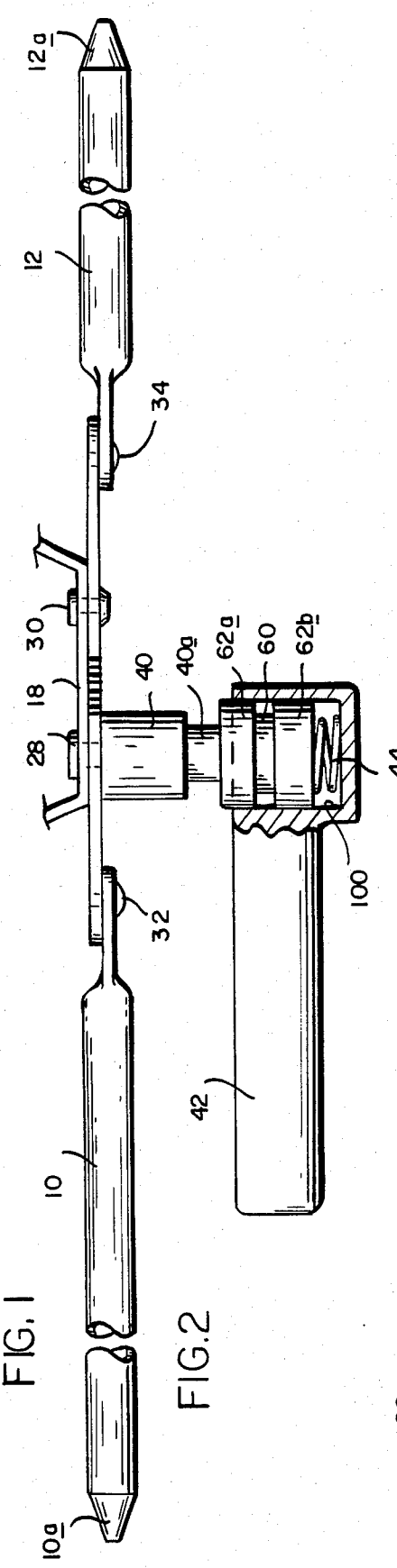
FIG. 2 is a plan view of FIG. 1.
Figure 3:
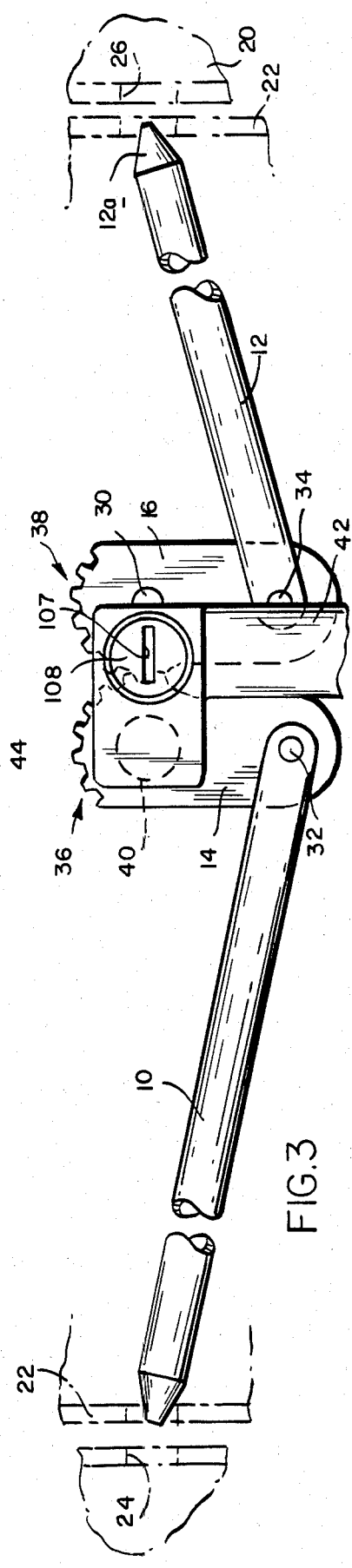
FIG. 3 is an elevation of the locking device in its unlocked position.

FIGS. 1, 2 and 3 illustrate the locking mechanism for locking the panels to the top structure of the vehicle, and in the remaining Figures, the specific structure of the lock itself and means for on the one hand enabling the lock mechanism and on the other hand for disabling the lock mechanism.

Referring to FIGS. 1 to 3, there is shown a mechanism comprising rigid rods or bolts 10 and 12 pivotally connected at their adjacent ends to links 14 and 16 which, in turn, are mounted to a bracket 18 fixed to the distal end of the roof panel which is to be locked in place. The roof panel, fragmentary portions of which are indicated at 20, has at its fore and aft edges bearing plates 22—22 through which the distal ends of the rods 10 and 12 extend and are movable axially therein. The rods 10 and 12 protrude through the bearings 22—22 and have conical end portions 10a and 12a which are adapted to be engaged within openings 24 and 26 in the roof frame. The links 14 and 16 are pivotally connected by means of pins 28 and 30 to the bracket 18 and by pivot pins 32 and 34 to the rods 10 and 12. At their proximal ends, the links 14 and 16 have interengaged arcuate toothed portions 36 and 38.

The link 14 is fixed by the pin 28 to a shaft 40 such that by rotation of the shaft 40, the links may be rotated relative to each other on the one hand to withdraw the rods 10 and 12 from their locking position and on the other hand to move them to their unlocking position as shown, respectively, in FIGS. 1 to 3. Rotation of the shaft 40 is effected by means of a handle 42 and a lock mechanism 44 shown in detail in FIGS. 4 through 13 inclusive structured to on the one hand enable the handle so that, when it is rotated, the locking rods will be engaged or disengaged and on the other hand to disable the handle so that the handle will turn freely on the shaft 40 without actuating the locking rods.

Referring to FIGS. 4 to 13, the lock assembly comprises two interacting cylindrical parts 46 and 48. The cylindrical part 46 contains a longitudinal opening comprising at one end a cylindrical portion 50, at the other end a cylindrical portion 52 and intermediate the ends, a rectangular portion 54, FIG. 11. The shaft 40 has a reduced part 40a dimensioned to fit into the cylindrical part 50 and is provided with a nub 40b of rectangular cross section dimensioned to fit into the rectangular opening 54 so that rotation of the cylindrical part 46 will rotate the shaft 40. The cylindrical part 46 is secured to the reduced portion 40a of the shaft 40 by a screw 58 inserted through the opening 52 and threaded into the nub 40b. The opening 52 provides for receiving a coiled spring 45. The cylindrical part 46 contains intermediate its opposite ends a peripheral groove 60 which divides the cylindrical part axially into two parts 62a, 62b. The part 62a has an axial concave cylindrical recess 66. The part 62b has in alignment with the recess 66, an axially-positioned flat side 68 of shorter axial length than the axial width of the part 62b, leaving a shoulder 70 between the inner end of the flat side 68 and the groove 60 of the same diameter as the part 62b.

The cylindrical part 48 which is rotated by the key relative to the cylindrical part 46 as will appear hereinafter is divided into two parts 72 and 74. The part 72 contains a rectangular opening 76 and the part 74 a circular opening 78. The part 72 has diametrically-opposed arcuate or cylindrical shoulders 80—80 and, at right angles thereto, diametrically-opposed flat sides 82—82. The part 74 has an annular shoulder 86 of lesser radius of curvature than the arcuate shoulders 80—80 of the part 72, a portion of which has a flat side 88 which constitutes an extension of one of the flat sides 82. The peripheral edge of the shoulder 86 contains an arcuate notch 90 which defines, in conjunction with the unnotched portion 92 thereof, peripherally-spaced shoulders 94 and 96.

The cylindrical part 48 as related above is rotatable relative to the cylindrical part 46 by a key-operated lock cylinder 98, FIG. 4.

The cylindrical parts 46 and 48 are assembled in operable adjacency within openings 100 and 102, FIG. 4, in the handle structure 42. The opening 100 is blind, FIG. 2, in that it is open at the inner side of the handle and closed at the outer side of the handle and is dimensioned to receive the cylindrical part 46 with the spring 45 interposed between the bottom or closed end of the opening and the inner end of the portion 52 so that, for a purpose which will appear hereinafter, the handle 42 may be moved axially on the surfaces 62a and 62b of cylindrical part 46. The opening 102 is open at both the inner side and the outer side of the handle and contains a cage 104 containing four equally-spaced grooves 104a for receiving the tumblers 106 of the key-operated lock cylinder 98, FIG. 4. The key-operated lock cylinder 98 has at its outer end 108 a keyhole 107, FIGS. 1 and 3, for receiving a key and at its inner end 110 a rectangular nub 110a containing a threaded hole 112. The cylindrical part 48 is assembled into the opening 102 from the inner side against the cage 104 and the key cylinder is inserted from the outside through the cage 104 to engage the end nub 110a within the opening 76 and the two are non-rotatably fixed to each other by a screw 114.

In order to assemble the aforesaid structure, assuming that the cylindrical part 46 is secured to the reduced end 40a of the shaft 40 by the screw 58 and that the cylindrical part 48 and key cylinder 98 are secured to the handle 42 by the screw 114, the handle 42 can be mounted onto the cylindrical part 46 by placing the key in the key-operated cylinder 98 and rotating the latter in a direction to position the flat sides 82, 88 of the cylindrical part 48, FIG. 10, parallel to the flat side 68 of the cylindrical part 46. In this position, the shoulder portion 70 of the part 62b will be clear of the cylindrical part 48 and the handle can be pushed inwardly on the surfaces 62a and 62b of cylindrical part 46 sufficiently to compress the spring 45 whereupon, by turning the key and thus rotating the key-operated lock cylinder, the recessed portion 90 of the shoulder 86 can be engaged behind the shoulder 70 so that the handle cannot now be removed from the shaft 40. Now, by turning the key-operated cylinder 98, the cylindrical part 48 can be rotated relative to the cylindrical part 46 to position an arcuate portion 80 of the cylindrical part 48 in the arcuate recess 66 in the cylindrical part 46, FIG. 8. In this position, the cylindrical part 48 cannot turn about the axis of the cylindrical part 46 relative to the cylindrical part 46 and, hence, rotation of the handle through the intermediary of the cylindrical part 48 rotates the cylindrical part 46 about its axis which, in turn, rotates the shaft 40. Rotation of the shaft 40 will either extend the bolts to a locking position or retract them therefrom. By further rotation of the key and the key cylinder 98 to a position such as shown in FIGS. 5 and 11 to dispose a flat side 82 of the cylindrical part 48 opposite the recess 66 in the cylindrical part 46, it is evident that, since the radius of the flat side 82 from the center of rotation of the cylindrical part 48 is less than the radius of the part 62a, the handle will be free to rotate about the axis of the shaft 40. In other words, in this position, the handle is disabled insofar as being able to transmit its rotary movement to the cylindrical part 46 and, hence, the shaft 40. In order to prevent the handle 42 from flopping around in its disabled position, the part 46 is provided with a concave detent 66a, FIG. 14, concentric with the recess 66 for receiving the shoulder 90 of the cylindrical part 74 which is biased into engagement therewith by the spring 45. Disengagement is achieved by pressing inwardly on the handle.

So long as the two cylindrical parts occupy either of the two positions, FIGS. 5 and 6, wherein on the one hand the handle can turn freely about the axis of the shaft 40 and on the other hand is locked so that rotation of the handle actuates the locking bars, the handle is held by engagement of the shoulder portion 70 of the cylindrical part 46 within the recess 90 of the shoulder 86.

FIGS. 7 and 11 show the position of the cylindrical parts wherein the cylindrical part 48 is rotatable about its own axis relative to the cylindrical part 46. In this position, as also known in FIG. 5, one of the flat sides 82 is positioned opposite the recess 66 of the cylindrical part 46. The handle 42 within which the cylindrical part 48 is situated is, accordingly, rotatable freely about the axis of the shaft 40. FIGS. 8 and 12 show the position of the cylindrical parts when the cylindrical part 48 is fixed with respect to the cylindrical part 46. In this position, as also shown in FIGS. 6 and 12, one of the arcuate portions 80 of the cylindrical part 48 is engaged within the recess 66 in the cylindrical part 46. The handle 42 within which the cylindrical part 48 is recessed is, accordingly, rotatable about the axis of the cylindrical part 46 and, by such rotation, rotates the shaft 40 which, in turn, either withdraws the locking bars or extends them. The shoulders 94,96 on the shoulder 86 limit the rotation of the cylindrical part 48 relative to the cylindrical part 46 so that, in one position, FIG. 7, the handle is free to turn without actuating the locking bar and, in the other position, FIG. 8, the handle is operable to actuate the locking bar. FIGS. 9 and 10 show the position of the cylindrical parts 46 and 48 which enables on the one hand removing the handle and on the other hand mounting the handle in position for use. Removal is effected by pushing the handle 42 inwardly, FIG. 9, against the opposition of the spring 45. Inward movement, as shown in FIG. 9, clears the non-recessed portion 92 at the end of the shoulder 86 of the cylindrical part 62b so that the cylindrical part 48 can be rotated relative to the cylindrical part 46 to position the flat sides 82,84 of the cylindrical part 48, FIGS. 10 and 13, opposite the recess 66. In this position, as shown in FIGS. 10 and 13, the cylindrical part 48 can be moved forwardly relative to the cylindrical part 46 to remove the handle. By the same token, the handle can be applied to the shaft by rotating the cylindrical part 48 to position the flat sides 82,88 in the same plane as the flat side 68 of the cylindrical part 46. This latter position is shown in FIGS. 10 and 13.

It is to be understood that while the locking device herein described is for the purpose of securing sunroofs comprised of two hinged panels hinged on the longitudinal center line of the vehicle, that it can be used in conjunction with a single panel hinged transversely of the roof. Further, it is within the scope of the invention to secure a panel without hinges by providing locking bolts at two opposite edges for engagement with the roof structure within which it is recessed.

It should be understood that the present disclosure is for the purpose of illustration only and includes all modifications or improvements which fall within the scope of the appended claims.

What is claimed is:

1. In combination, a rotatable shaft, handle and means mounting the handle to the shaft and wherein the handle contains adjacent parallel openings, a first part fixed to the shaft within one of the openings, a second part rotatably mounted to the handle within the other opening, said first part containing an arcuate recess and said second part having diametrically-opposed arcuate shoulders of the radius of curvature of the arcuate recess and diametrically-opposed flat sides at right angles thereto and wherein the parts are positioned within the adjacent openings in the handle for rotation about spaced, parallel axes so that by rotation of the parts relative to each other, one of the arcuate shoulders of the said second part can be positioned in the arcuate recess in the first part, in which position rotation of the handle will rotate the parts in orbit about the axis of the first part and, hence, rotation of the shaft and, alternatively, positioned to dispose one of the flat sides opposite the recess, in which position the handle is disabled and, hence, can be rotated about the axis of the first part without rotating the first part and, hence, without rotating the shaft, and a means comprising a detent in the first part concentric with the recess therein and an annular shoulder on the second part which, by engagement with the detent, prevents the handle from rotating freely in its disabled position.

2. A combination according to claim 1 wherein there is a pair of bolts mounted to be alternately extended and retracted relative to each other by rotation of the shaft.

3. A combination according to claim 1 wherein the parts embody rotatably interengageable means which on the one hand can be positioned by limited axial movement relative to each other and rotation of one of the parts relative to the other in said axially-displaced position to clear said interengageable means from each other to permit the handle to be dismounted from the shaft.

4. A combination according to claim 1 wherein there is spring means for yieldably holding the shoulder on the second cylindrical part engaged within the detent.

5. A combination according to claim 4 wherein there is means yieldably biasing the handle in a direction to prevent disengagement of a shoulder on the first cylindrical part from the end of the second cylindrical part.

6. A combination according to claim 1 wherein there is a shoulder on the first part which overlaps an end of the second part in one position of the parts relative to each other which prevents axial movement of the parts in a direction to remove the handle from the shaft and a flat side on the second part which clears the shoulder on the first part when the parts are in another position to permit axial movement of the parts in a direction to remove the handle from the shaft.

7. A combination according to claim 6 wherein there are overlapping shoulders on the respective cylindrical parts so positioned that the shoulder on the second cylindrical part is behind the shoulder on the first cylindrical part, preventing axial movement of the second cylindrical part relative to the first cylindrical part in a direction to enable removing the handle and wherein the shoulder on the second cylindrical part has a flat side which clears the shoulder on the first cylindrical part such that when the flat side of the second cylindrical part is positioned opposite the shoulder of the first cylindrical part, the cylindrical parts can be moved axially with respect to each other to enable removing the handle.

8. A combination according to claim 6 wherein there is a coiled spring positioned between the handle and the first cylindrical part which normally prevents disengagement of the shoulders, but which will yield under pressure to permit disengagement of the shoulders.

9. A combination according to claim 1 wherein there is means yieldably biasing the handle in an axial direction to prevent disengagement of said interengageable means.

10. A combination according to claim 9 wherein the first cylindrical part contains a concave detent concentric with the arcuate recess within which an annular shoulder on the second cylindrical part is held engaged by the spring means when the handle is disabled to prevent free rotation of the handle about the shaft.

11. The combination comprising a shaft, a handle and means mounting the handle to the shaft and wherein the handle contains adjacent parallel openings, a first cylindrical part fixed to the shaft within one of the openings, said first cylindrical part containing a peripheral groove and at one side of said groove an arcuate recess, a second cylindrical part rotatably mounted to the handle within the other opening, said second cylindrical part having diametrically-positioned arcuate shoulders corresponding in radius of curvature to the recess in the first cylindrical part, diametrically-opposed flat surfaces at right angles thereto and an annular shoulder at one end and wherein the second cylindrical part can be rotated relative to the first cylindrical part to on the one hand position an arcuate shoulder of the second cylindrical part in the arcuate recess in the first cylindrical part and on the other hand to position one of the flat surfaces of the second cylindrical part opposite the recess in the first cylindrical part, and wherein said annular shoulder is of greater axial length than the width of the groove in the first cylindrical part and contains a recess such as to extend beyond the groove in the first cylindrical part to receive a portion of the first cylindrical part in overlapping relation and a flat side which clears said portion of the first cylindrical part such that when the cylindrical parts are positioned so that the annular shoulder of the second cylindrical part occupies the recess, the handle cannot be removed from the shaft, but when the flat side is positioned opposite the recess, the handle can be removed from the shaft.

12. A combination according to claim 11 wherein there is a pair of latch bolts mounted to be alternately extended and retracted relative to each other by rotation of the shaft.

13. A combination according to claim 11 wherein the end edge of an annular shoulder on the second cylindrical part contains an arcuate recess defining peripherally-spaced shoulders which, by engagement with a shoulder on the first cylindrical part, limit relative rotation of the second cylindrical part between positions in which an arcuate shoulder of the second cylindrical part is seated in the recess in the first cylindrical part and a flat side of the second cylindrical part is opposite the recess in the first cylindrical part.

* * * * *